United States Patent

Gleim

[15] 3,657,008
[45] Apr. 18, 1972

[54] POLYESTER WIRE INSULATION

[72] Inventor: Clyde E. Gleim, Akron, Ohio

[73] Assignee: The Goodyear Tire & Rubber Company, Akron, Ohio

[22] Filed: Feb. 2, 1970

[21] Appl. No.: 8,015

[52] U.S. Cl. ............................................. 117/218, 117/232
[51] Int. Cl. ....................... B44d 1/16, B44d 1/18, B44d 1/42
[58] Field of Search ................ 117/218, 232, 161 K, 161 UB, 117/161 UC, 75

[56] References Cited

UNITED STATES PATENTS

| | | | |
|---|---|---|---|
| 3,022,200 | 2/1962 | Koerner et al. | 117/218 |
| 3,378,402 | 4/1968 | Wiener | 117/218 |
| 3,423,281 | 1/1969 | Wiener | 117/75 |
| 3,372,148 | 3/1968 | Wiener | 161/205 |
| 2,965,613 | 12/1960 | Milone et al. | 260/31.2 R |
| 3,386,960 | 6/1968 | Wiener | 260/47 C |
| 3,427,287 | 2/1969 | Pengilly | 260/45.7 P |
| 3,201,276 | 8/1965 | Meyer et al. | 117/218 |
| 3,240,626 | 3/1966 | Olson et al. | 117/218 |
| 3,296,024 | 1/1967 | Jordan et al. | 117/218 |
| 3,374,114 | 3/1968 | Wiener | 117/218 |

Primary Examiner—William D. Martin
Assistant Examiner—Raymond M. Speer
Attorney—F. W. Brunner and J. M. Wallace, Jr.

[57] ABSTRACT

The invention relates to insulation coatings for wire consisting of an outer jacket coating of highly crystallizable polyester resin and an undercoat of softer less crystallizable polyester resin.

5 Claims, No Drawings

POLYESTER WIRE INSULATION

An object of the invention is to prepare an improved polyester wire insulation.

Another object is to prepare a polyester electrical conductor wire insulation which will not crack when subjected to aging at elevated temperatures followed by winding around a mandrel 1 to 3 times the coated wire's diameter.

Still another object is to prepare a polyester wire insulation with improved surface hardness.

Polyesters are known to have good electrical properties and make good insulations for electrical applications. For example poly(ethylene terephthalate) film has a Dielectric Constant ($10^3$ cps) of 3.1, Dissipation Factor ($10^3$ cps) of 0.0047, Dielectric Strength (V/mil) of 7000 and Volume Resistivity (r-cm) of $10^{18}$. However, polyesters, such as poly(ethylene terephthalate), poly(tetramethylene terephthalate) and other highly crystallizable type polyesters are not entirely satisfactory as insulation coatings on conductor wires which are wound due to a tendency to crack, particularly after exposure to temperatures above room temperature for periods of time. These polyesters undergo changes in density through crystallization and changes in percent elongations from heat treatment. These changes apparently set up stresses, particularly after bending of the coated wires which results in failure of the insulation.

The copolyesters, such as the poly[ethylene terephthalate/isophthalate/aliphatic dicarboxylate (adipate, azelate, sebacate)] type are less highly crystallizable, have more percent elongation than the homopolyesters mentioned above and are suitable as wire insulation coatings. These copolyesters, however, have limited areas of application due to the coating hardness, being softer than the homopolyesters.

This invention gives a process for utilizing the merits of both types polyesters for making an improved insulation for electrical conductor wires. The insulation coatings of this invention consist of a copolyester undercoat followed by a polyester jacket coat. The combination of the two coatings in this order allows for an insulation coating with good surface hardness and which has essentially no tendency to crack when subjected to heat treatment followed by a bending test. The coatings may be applied by a two-step extrusion coating process wherein the copolyester coating is applied to the base wire, followed by the homopolyester jacket coat. The coatings of this invention may also be applied from solutions of the polyesters wherein the electrical wire is dipped or passed through a solution of the copolyester a sufficient number of times to build up the desired undercoat thickness and then through a solution of the homopolyester (or highly crystallizable copolyester such as 90/10 ethylene terephthalate/isophthalate, 95/5 ethylene terephthalate/dimerate, 95/5 ethylene glycol/neopentyl terephthalate, 90/10 tetramethylene terephthalate/isophthalate, etc.) to build up the desired thickness of the harder jacket coat.

The cross-sectional wall thickness of the undercoat may range from about 5 mils to 50 mils (0.005 inch to 0.050 inch) with 7 mils to 35 mils being the preferred thickness.

The cross-sectional wall thickness of the jacket outer coating may range from 1 mil to 10 mils (0.001 inch to 0.010 inch) with 4 to 7 mils being the preferred outer coating wall thickness.

The diameter of the electrical conductor wire is not critical and usually ranges from 0.010 inch to 0.040 inch. For example, a computer wire for some applications has a wire diameter of 0.021 inch.

The copolyesters of this invention may be prepared by processes described in U.S. Pat. Nos. 3,423,281, 3,372,148, 2,965,613, and British Pat. No. 1,029,136, but not limited to these particular processes. For example a 75/25 polyethylene terephthalate/isophthalate copolyester may be prepared by the direct esterification/polycondensation route rather than by the transesterification/polycondensation route, if desired. Some examples of copolyesters suitable as undercoat material are the poly(tetramethylene terephthalate/isophthalate/s ebacate) copolyesters (70/10/20, 70/5/25, 80/5/15 molar ratios), the poly(tetramethylene terephthalate/isophthalate) copolyesters (from 30 to 70 mol percent terephthalate units), the poly(ethylene/neopentyl terephthalate) copolyesters (from 40 to 75 percent terephthalates), poly(ethylene/hexamethylene terephthalate) copolyesters (from 25 to 55 mol percent ethylene terephthalate units), the poly(ethylene terephthalate/sebacates) copolyesters (from 40 to 75% terephthalate), poly(ethylene terephthalate/isophthalate/azelate) copolyesters containing up to 30 mol azelate units, and 1 to 10 mol isophthalate units, the poly(ethylene/neopentyl/t erephthalate/sebacate) copolyesters (from 45 to 55 mol ethylene units, 55 to 45 mol percent neopentyl units, 60 to 80 mol percent terephthalate units and 20 to 40 mol percent sebacate units), the poly(ethylene terephthalate/naphthalate) copolyesters (from 30 to 70 mol percent terephthalate units, the poly(cyclohexylene dimethylene terephthalate/isophthalate) copolyesters (from 50 to 65 mol percent terephthalate units), the poly(hexamethylene terephthalate/isophthalate) copolyesters (from 25 to 60 mol percent terephthalate units), and other copolyesters of the slightly crystallizable types. Blends of the above described slightly crystallizable type copolyesters also may be used.

The homopolyesters or highly crystallizable copolyesters may be prepared by processes described in U.S. Pat. Nos. 3,427,287, 3,386,960, and 2,965,613. Examples of some jacket coating type homopolyesters are poly(ethylene terephthalate), poly(tetramethylene terephthalate), poly(ethylene naphthalates), and poly(trans cyclohexylene dimethylene terephthalate). Some examples of highly crystallizable copolyesters are those of ethylene terephthalate/isophthalate (90/10 to 95/5), ethylene/neopentyl terephthalate (90/10 to 95/5), ethylene terephthalate/dimerate (95/5 to 97.5/2.5), ethylene terephthalate/naphthalate (90/10 to 95/5), and tetramethylene terephthalate/isophthalate (90/10 to 95/5). Blends of polyesters may also be employed if desired; example, ethylene terephthalate plus tetramethylene terephthalate (50/50 blend). Stabilizers may be employed in the polyesters if desired, such as the conventional phosphite types (trialkyl or triaryl phosphite), diphenyl benzene phosphonate, tricresyl phosphate, phosphorus acid, thiophosphite types, and/or hindered phenolic phosphites, such as described in U.S. Pat. Nos. 3,386,952 and 3,361,846, or a mixture of an antioxidant and a phosphorus compound such as described in French Pat. No. 1,438,079.

Dyes for color coding may also be employed, as well as pigments, if desired, without detracting from the scope of the invention.

EXAMPLE 1

Extrusion conditions for a 45 mil wall coating of a 70/10/20 poly(tetramethylene terephthalate/isophthalate/sebacate) copolyester on 0.021 inch diameter computer wire were: Extruder - 1½ inches; screw 5/1; screen pack 40/250/40 mesh; throat (water cooled 75° F.) zone 1 temperature 400° F., zone 2 temperature 400° F., zone 3 temperature 400° F.; die temperature 400° F.; windup speed 40 rpm.

Extrusion conditions for a 5 mil wall jacket coating of poly(ethylene terephthalate) homopolyester were the same as above except zone 1 temperature 490° F., zone 2 temperature 520° F., zone 3 temperature 540° F., die temperature 540° F., windup speed 40 rpm.

The copolyester used for the primary coating and the homopolyester used for the jacket coating were stabilized with 2.0 weight percent of a hindered phenolic phosphite type stabilizer, such as described in U.S. Pat. No. 3,386,952. A commercial antioxidant such as Vanderbilt's "Agerite Geltrol" (hindered phenolic antioxidant) may be used as the antioxidant stabilizer if desired.

The polyester wire was aged 7 days at 113° C. in loose coil form in an air-circulated oven. The coil was allowed to cool a minimum of two hours and checked for cracks under a microscope. No cracks were observed. The insulated wire was then wound around mandrels one and three times its diameter and allowed to stand for 8 hours and examined for any stress cracks under the microscope. No cracks were observed. The twisted samples were then immersed in 75° F. water for a minimum of 30 minutes. No cracks were observed under the microscope.

The following dielectric test was made. The stripped end of the sample was clamped to one lead wire of the dielectric testing machine. The other lead wire was inserted over a 5/16-inch diameter steel rod which was vertically positioned in a 4,000 milliliter beaker of wetting agent solution. The wire coating sample was positioned in the beaker so that the bent loops were immersed in the solution. The unstripped end of the wire coating sample was kept out of the solution and away from the metal rod electrode.

The dielectric tester was set to automatically apply 500 volts per second across its terminals. Testing began by first bringing the voltage up to 2 kilovolts where it was held for one minute before being raised again. Testing ceased when a voltage breakdown occurred. In the instant example the kilovolt failure was a 9.2 kilovolts.

EXAMPLE 2

Fifty mils of polyethylene terephthalate were extrusion coated on a 0.021 inch diameter electrical conductor wire. This polyester, stabilized with 0.04 weight percent triphenyl phosphite and 2.0 weight percent "Agerite Geltrol" (hindered phenolic antioxidant), was extrusion coated onto the electrical conductor wire under conditions given in Example 1 for the above mentioned polyethylene terephthalate jacket coating. The resulting insulation coating was tested under conditions described in Example 1.

In the aging test two out of the six samples failed the heat aging test. Of the four remaining samples two failed the winding test when wound around a mandrel one time its diameter. Thus, these examples show that the polyethylene terephthalate along is inferior to the insulation coating of Example 1 which consists of a softer copolyester as the undercoat followed by the harder, more crystallizable jacket coating.

Resort may be had to modifications and variations of the disclosed embodiments without departing from the spirit of the invention or the scope of the appended claims.

What is claimed is:

1. An improved polyester insulation coated electrical conductor wire consisting essentially of a conductor wire base with a jacket coat comprising a member selected from the group consisting of crystallizable homopolyesters and crystallizable copolyesters and a softer less crystallizable copolyester undercoat.

2. A polyester insulation coated electrical conductor wire consisting essentially of a conductor wire base with an undercoat comprising 70/10/20 poly(ethylene terephthalate/isophthalate/sebacate) copolyester and a jacket coat comprising poly(ethylene terephthalate).

3. An insulation coated conductor wire consisting essentially of a conductor wire base with an undercoat comprising 70/10/20 poly(ethylene terephthalate/isophthalate/sebacate) copolyester, and wherein the jacket coat comprises poly(tetramethylene terephthalate).

4. A polyester insulation coated electrical conductor wire consisting essentially of a conductor wire base with an undercoat comprising 70/30 poly(ethylene terephthalate/isophthalate) and a jacket coat comprising poly(ethylene terephthalate).

5. A polyester insulated coated electrical conductor wire consisting essentially of a conductor wire base with an undercoat comprising 70/30 poly(ethylene/neopentyl terephthalate) and a jacket coat comprising poly(ethylene terephthalate).

* * * * *